(12) United States Patent
Ota et al.

(10) Patent No.: US 8,420,272 B2
(45) Date of Patent: Apr. 16, 2013

(54) FUEL CELL SYSTEM CONTROL DEVICE

(75) Inventors: Masataka Ota, Anjo (JP); Mikio Kizaki, Toyoake (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 898 days.

(21) Appl. No.: 10/589,434

(22) PCT Filed: Mar. 15, 2005

(86) PCT No.: PCT/JP2005/005075
§ 371 (c)(1),
(2), (4) Date: Aug. 15, 2006

(87) PCT Pub. No.: WO2005/088754
PCT Pub. Date: Sep. 22, 2005

(65) Prior Publication Data
US 2007/0141418 A1  Jun. 21, 2007

(30) Foreign Application Priority Data
Mar. 17, 2004 (JP) .................................. 2004-076467

(51) Int. Cl.
*H01M 8/04* (2006.01)
(52) U.S. Cl.
USPC .......................................... 429/433; 429/428
(58) Field of Classification Search .................. None
See application file for complete search history.

(56) References Cited

U.S. PATENT DOCUMENTS

| | | | |
|---|---|---|---|
| 3,926,051 A | 12/1975 | Katzman | |
| 5,965,288 A | 10/1999 | Okamoto | |
| 6,186,254 B1 * | 2/2001 | Mufford et al. | 429/442 |
| 6,555,989 B1 * | 4/2003 | Pearson | 320/101 |
| 6,593,671 B1 * | 7/2003 | Schell | 307/87 |
| 7,354,673 B2 | 4/2008 | Fujita et al. | |
| 2001/0014415 A1 | 8/2001 | Iio et al. | |
| 2003/0031900 A1 | 2/2003 | Tajima et al. | |

(Continued)

FOREIGN PATENT DOCUMENTS

| | | |
|---|---|---|
| DE | 102 30 783 A1 | 1/2004 |
| DE | 10 2004 024 117 A1 | 12/2004 |

(Continued)

OTHER PUBLICATIONS

Machine translation of JP 2003-282106, retrieved from <http://www19.ipdl.inpit.go.jp/PA1/cgi-bin/PA1INIT?1347574611011> on Sep. 11, 2012.*

*Primary Examiner* — Cynthia Lee
(74) *Attorney, Agent, or Firm* — Oliff & Berridge, PLC

(57) ABSTRACT

In order to reliably avoid freezing in the generation stop state during intermittent operation, in the control device of the present invention that controls a fuel cell system to operate intermittently by switching between the generation state and the generation stop state of a fuel cell, it is determined whether to stop the generation operation during intermittent operation based on at least the temperature of a specific component that contains moisture from among the components constituting the fuel cell system. A valve, a passage, or a humidifier arranged on a flow path for a fuel gas or oxidizing gas may be selected as the specific component mentioned above. The temperature of the specific component is measured either directly by a temperature sensor provided corresponding to the specific component or indirectly based on either the operating state of the fuel cell system or the external air temperature.

8 Claims, 5 Drawing Sheets

U.S. PATENT DOCUMENTS

| | | |
|---|---|---|
| 2003/0232226 A1 | 12/2003 | Morishima et al. |
| 2004/0229097 A1 | 11/2004 | Hirakata et al. |
| 2007/0054165 A1 | 3/2007 | Yoshida et al. |

FOREIGN PATENT DOCUMENTS

| | | |
|---|---|---|
| JP | A-11-214025 | 8/1999 |
| JP | A-2001-143736 | 5/2001 |
| JP | A-2001-307758 | 11/2001 |
| JP | A-2002-034171 | 1/2002 |
| JP | A-2002-246054 | 8/2002 |
| JP | A-2002-319425 | 10/2002 |
| JP | A-2003-100328 | 4/2003 |
| JP | A-2003-151601 | 5/2003 |
| JP | A-2003-178781 | 6/2003 |
| JP | A-2003-282106 | 10/2003 |
| JP | A-2005-108832 | 4/2005 |
| WO | WO 02/056403 A1 | 7/2002 |
| WO | WO 03/043113 A1 | 5/2003 |
| WO | WO 2004/006366 A2 | 1/2004 |
| WO | WO 2004/021493 A1 | 3/2004 |
| WO | WO 2004/091029 A1 | 10/2004 |

* cited by examiner

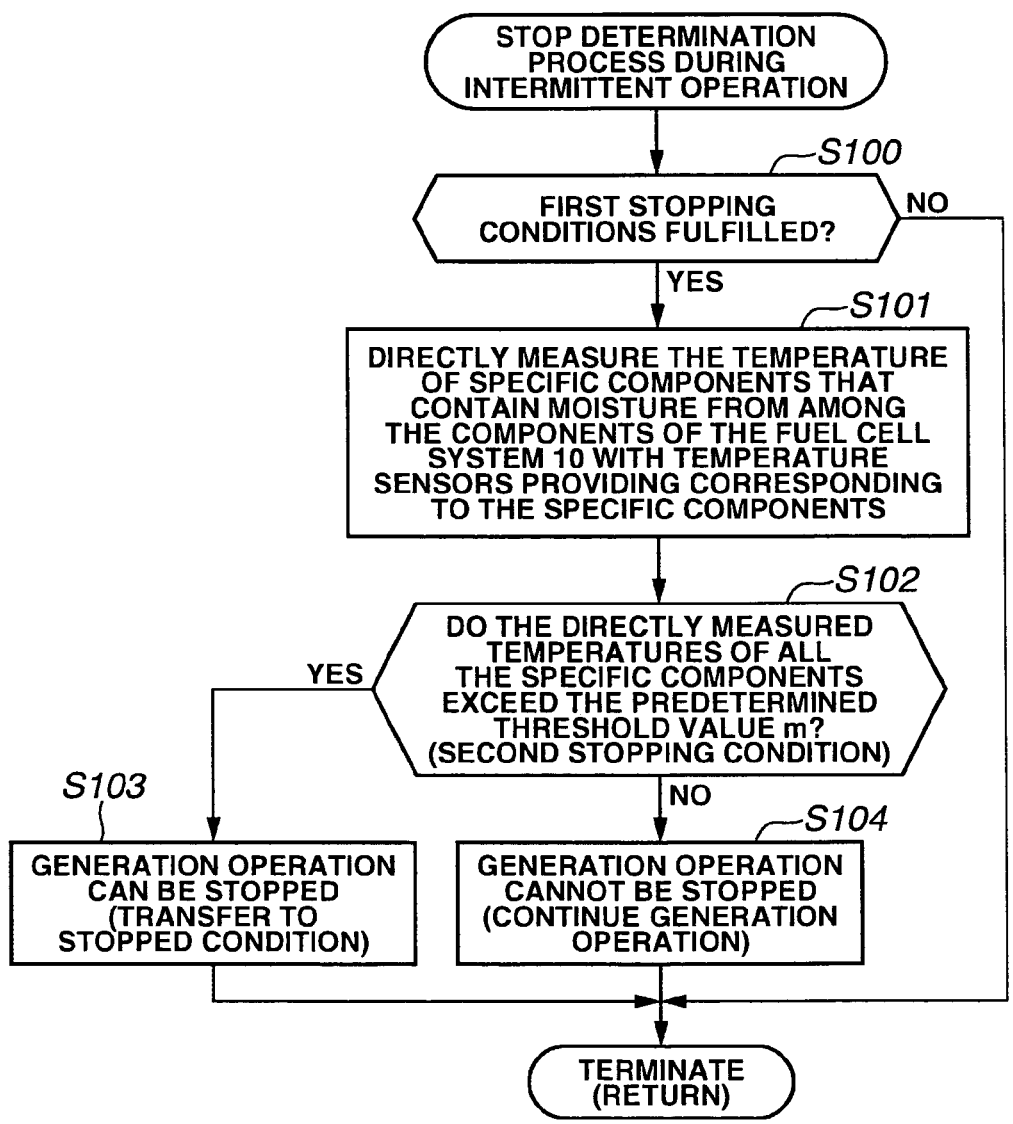

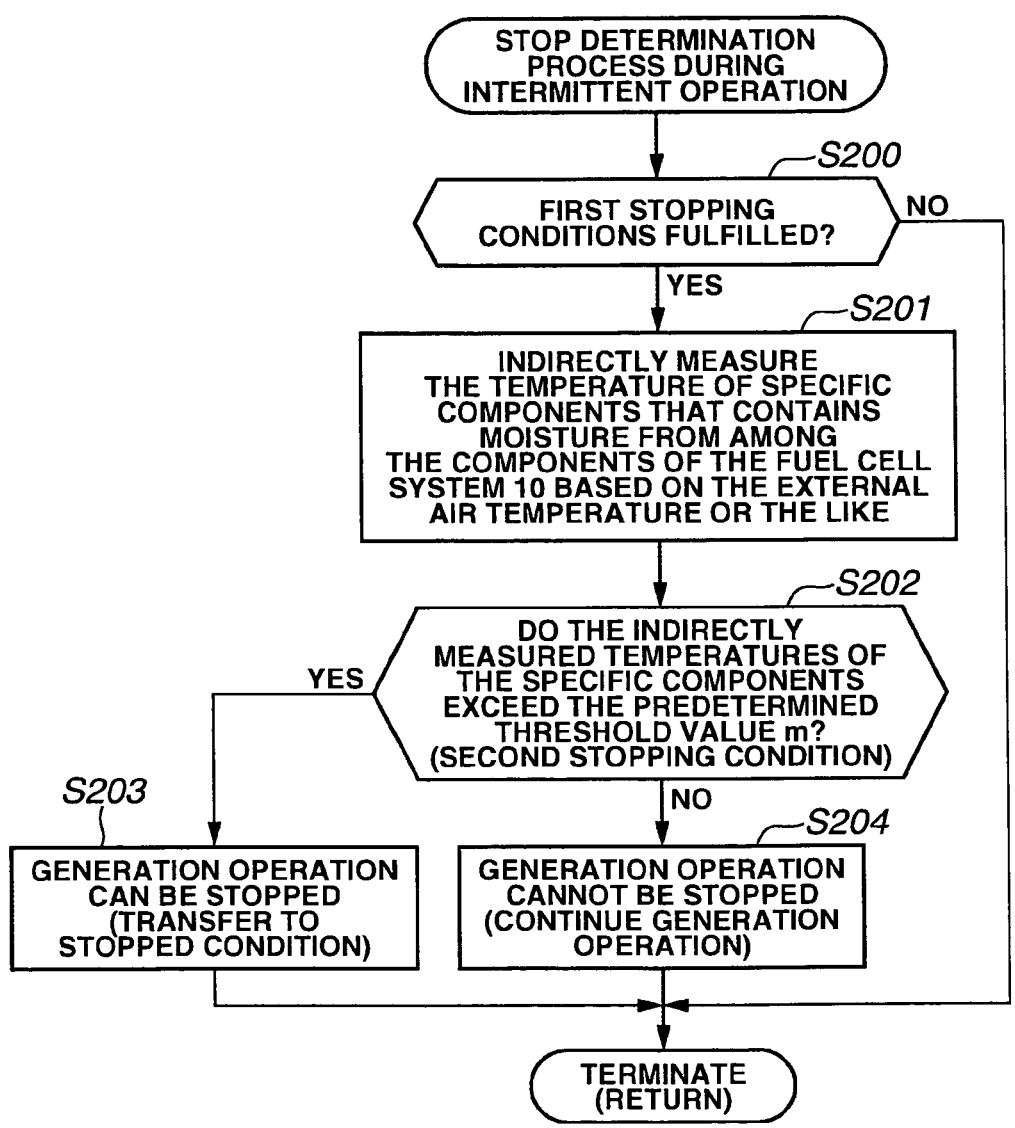

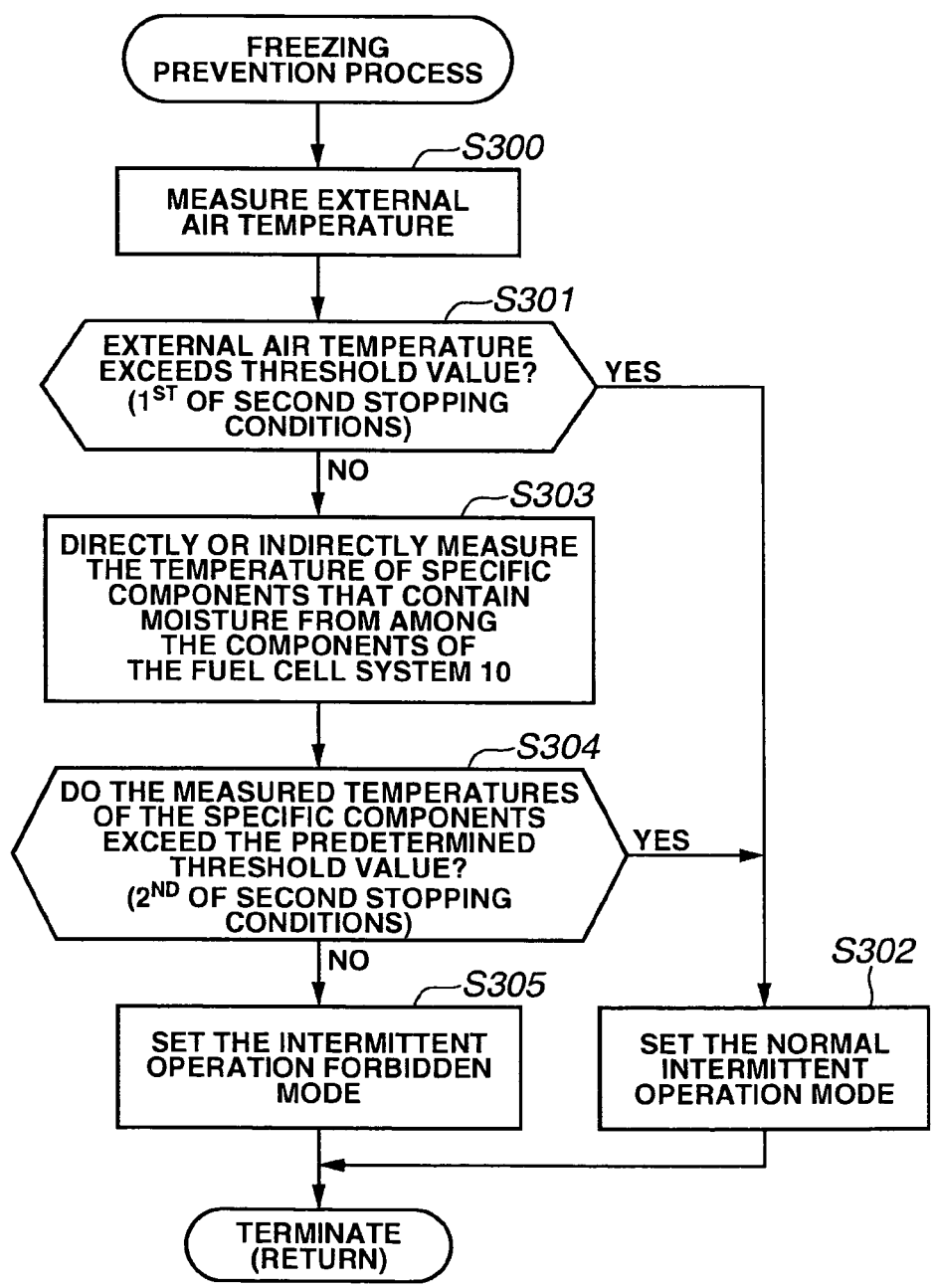

FUEL CELL SYSTEM CONTROL DEVICE

CROSS-REFERENCES

The present invention relates to a fuel cell system control device, and more particularly to the technology for controlling a fuel cell system so that the fuel cell system intermittently operates by switching between the generation state and the generation stop state of the fuel cell.

BACKGROUND

If the stop state of a fuel cell system continues for long in a low temperature environment such as outdoors in cold regions, there is a danger that moisture within the system will freeze. Such freezing may cause breakdown, so many methods have been developed and proposed to prevent freezing in fuel cell systems to date. For example, in Japanese Patent Application Laid-open No. 2003-151601, a method of preventing freezing is disclosed in which when stopping a fuel cell, the fuel cell is controlled to stop after the temperature of the fuel cell has been raised, to extend the time before freezing occurs in the fuel cell in the stop state, thereby preventing the temperature of the fuel cell from dropping to a temperature to cause freezing when the fuel cell is restarted.

SUMMARY

When a fuel cell system is used as the power source to drive an electric automobile, normally a configuration is adopted in which in addition to the fuel cell, an electricity storage device (secondary battery or capacitor) is provided. In this case when braking the electric automobile for example, electrical power regenerated in an electric motor is accumulated in the electricity storage device. During normal running, when the power supplied by the electricity storage device is sufficient (for example, during low speed running, or during low load such as when the vehicle is temporarily stopped), the electricity storage device alone supplies power to the electric motor. When the power supplied by the electricity storage device alone is not sufficient, both the electricity storage device and the fuel cell supply power to the electric motor. In other words, a fuel cell system is controlled to operate intermittently by switching between the generation state and the generation stop state, depending upon the power required by the electric automobile and the state of charging of the electricity storage device.

The above mentioned freezing problem occurs even in a case where fuel cell systems are controlled to operate intermittently. In other words, when being operated intermittently in a low temperature environment, if the stop state of the fuel cell system continues for a long time, there is a danger that moisture within the system will freeze.

However, in the method of preventing freezing disclosed in Japanese Patent Application Laid-open No. 2003-151601, no measure is taken to prevent progress of cooling after the fuel cell system is once stopped, so it is not possible to reliably avoid occurrence of freezing during the stop state of intermittent operation with this method. In other words, even though the method disclosed in Japanese Patent Application Laid-open No. 2003-151601 can extend the time before freezing occurs in a fuel cell, cooling proceeds as long as the stop state continues, so if the stop state during intermittent operation continues for a long time, freezing will eventually occur. In particular, in the case where the temperature when the generation is stopped is determined based on a value of expected time until starting the fuel cell again that is not necessarily accurately known, the possibility of freezing is increased.

Therefore it is an object of the present invention to reliably avoid freezing from occurring in the stop state during intermittent operation.

In order to solve the above problem, in the control device of the present invention that controls a fuel cell system to operate intermittently by switching between the generation state and the generation stop state of a fuel cell, it is determined whether to stop the generation operation during intermittent operation based on at least the temperature of a specific component from among the components of the fuel cell system that contains moisture. At least one of a valve, a passage, and a humidifier arranged on a flow path for a fuel gas or oxidizing gas, can be selected as the specific component mentioned above. According to this configuration, when the temperature of the specific component is low and the risk of freezing of moisture is determined to be high, the generation operation in intermittent operation is not stopped, so freezing of the moisture can be reliably avoided.

Also it is desirable that the temperature of the specific component is measured either directly by a temperature sensor provided corresponding to the specific component, or indirectly based on at least one of either the operating state of the fuel cell system or the external air temperature.

Also it is desirable that in determining whether to stop or not, if it is determined to not stop, the generation state of the fuel cell system is controlled so that the measured temperature exceeds a threshold value.

A fuel cell system according to the present invention, which has a control device that controls the fuel cell system to operate intermittently by switching between the generation state and the generation stop state of a fuel cell, comprises: means for determining the risk of freezing of a specific component that contain moistures from among the components constituting the fuel cell system; and control means that forbids intermittent operation when it is determined that the risk of freezing is high.

A fuel cell system according to the present invention, which comprises, as an electrical power supply source to a consumption device that consumes electrical power, a fuel cell and an electricity storage device that stores electrical power generated by the fuel cell, and which operates intermittently by switching between the generation state and the generation stop state of the fuel cell, further comprises the control device according to the present invention.

A fuel cell hybrid vehicle according to the present invention, comprises a fuel cell system according to the present invention.

According to the present invention, freezing occurring in the generation stop state during intermittent operation can be reliably avoided.

DESCRIPTION OF THE DRAWINGS

FIG. 3 is a flowchart showing the flow of the process for determining whether to stop generation in intermittent operation in the first embodiment;

FIG. 4 is a flowchart showing the flow of the process for determining whether to stop generation in intermittent operation in the second embodiment; and FIG. 5 is a flowchart showing the flow of the freeze prevention operation.

DETAILED DESCRIPTION

The following is an explanation of the best mode for carrying out the invention, with reference to the drawings.

Figure 2:
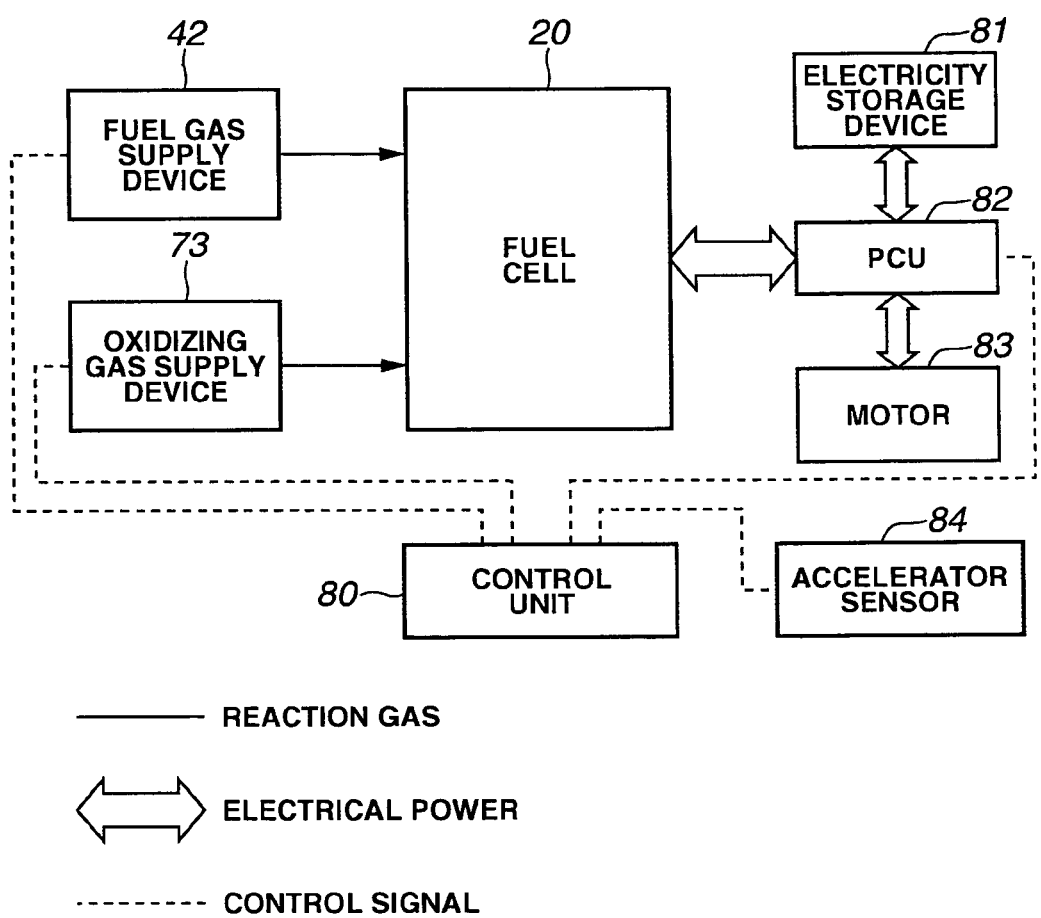
FIG. 2 shows a main configuration of a fuel cell system according to the embodiment.

FIG. 2 is a simplified configuration of a fuel cell system installed in a fuel cell electric automobile.

A fuel cell system 10 includes mainly a fuel gas supply device 42, an oxidizing gas supply device 73, a fuel cell 20, and a control unit 80. The fuel gas is hydrogen, for example, and the oxidizing gas is air, for example. The control unit 80 determines the power generation amount required from the fuel cell 20 from the degree of opening of an accelerator pedal measured by an accelerator sensor 84, controls the fuel gas supply device 42 and the oxidizing gas supply device 73 so that the required power generation amount is obtained, and adjusts the flow rate of fuel gas and oxidizing gas supplied to the fuel cell 20. A PCU 82 is an electrical power control device that includes an inverter and a DC/DC converter, and converts the direct current power generated by the fuel cell 20 into alternating current power and supplies the power to a motor 83 that runs the vehicle and other load devices, as well as accumulating excess electrical power in an electricity storage device 81 (secondary battery or capacitor). The electricity storage device 81 stores energy regenerated during brake regeneration, and serves an energy buffer for load fluctuations during acceleration and deceleration of the vehicle.

Figure 1:
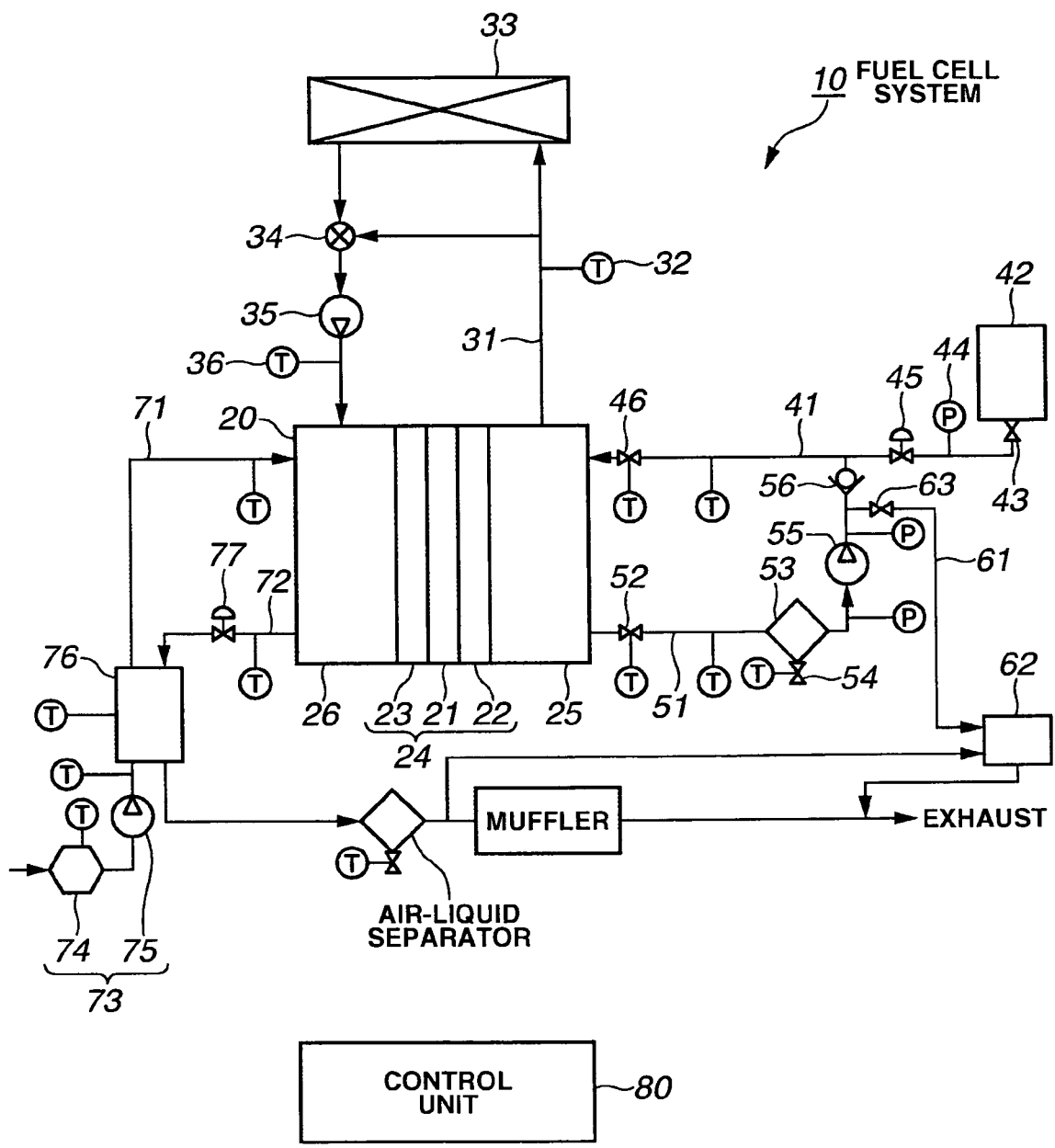
FIG. 1 shows a configuration of a fuel cell system according to the embodiment, focusing on the piping system.

FIG. 1 shows a configuration of the fuel cell system 10, focusing on the piping system. As shown in FIG. 1, the fuel cell system 10 includes a system that supplies fuel gas and a system that supplies oxidizing gas to the fuel cell 20, and a system that cools the fuel cell 20.

The fuel cell 20 includes a membrane electrode assembly 24 obtained by forming an anode 22 and a cathode 23 by screen printing or the like on either side of a polymer electrolysis membrane 21 that comprises (consists of) an ion exchange membrane or the like having proton conductivity formed from a fluorine resin membrane or similar. The membrane electrode assembly 24 is sandwiched on both sides by separators (not shown in the drawings) having flow paths for fuel gas, oxidizing gas, and cooling water, and a groove-shaped anode gas channel 25 and a cathode gas channel 26 are formed between the separator and the anode 22 and between the separator and cathode 23, respectively. An oxidizing reaction occurs at the anode 22 in accordance with Formula (1), and a reducing reaction occurs at the cathode 23 in accordance with Formula (2). An electromotive reaction occurs in the fuel cell 20 as a whole in accordance with Formula (3).

$$H_2 \rightarrow 2H^+ + 2e- \qquad (1)$$

$$(1/2)O_2 + 2H^+ + 2e- \rightarrow H_2O \qquad (2)$$

$$H_2 + (1/2)O_2 \rightarrow H_2O \qquad (3)$$

For simplicity of explanation, the figure shows schematically the structure of a unit cell comprising (consisting of) the membrane electrode assembly 24, the anode gas channel 25, and the cathode gas channel 26, but in reality a plurality of unit cells are connected in series via the separators into a stack structure.

The cooling system of the fuel cell system 10 includes a cooling path 31 that circulates cooling water, a temperature sensor 32 that measures the temperature of cooling water discharged from the fuel cell 20, a radiator 33 (heat exchanger) that radiates the heat of the cooling water to the outside, a valve 34 that adjusts the flow rate of cooling water flowing into the radiator 33, a pump 35 that pressurizes and circulates the cooling water, and a temperature sensor 36 that measures the temperature of the cooling water supplied to the fuel cell 20.

The fuel gas supply system of the fuel cell system 10 includes a fuel gas flow path 41 that supplies fuel gas to the anode gas channel 25, and a circulating flow path 51 that returns the fuel offgas discharged from the anode gas channel 25 to the fuel gas flow path 41; these gas flow paths form the fuel gas circulation system.

The fuel gas flow path 41 includes a shutoff valve 43 that controls the supply and stopping of fuel gas from the fuel gas supply device 42, a pressure sensor 44 that measures the pressure of the fuel gas, a regulator 45 that adjusts the pressure of the fuel gas, and a shutoff valve 46 that opens and closes the fuel gas supply port (inlet) of the fuel cell. The fuel gas supply device 41 can be for example a high pressure hydrogen tank, a hydrogen absorption alloy, a reformer, or similar.

The circulation flow path 51 includes a shutoff valve 52 that discharges fuel offgas, a gas-liquid separator 53 that recovers moisture from the fuel offgas, a discharge water valve 54 that directs recovered water to a tank not shown in the drawings, a circulation pump (pressurization means) 55 that is driven by a motor, and a back flow prevention valve 56 that prevents back flow of fuel gas in the fuel gas flow path 41 to the circulation flow path 51 side. On the basis of the control by the control unit 80, the circulation pump 55 compresses the fuel offgas that loses pressure when passing the anode gas channel 25 to a suitable gas pressure and returns the fuel offgas to the fuel gas flow path 41. The fuel offgas merges with the fuel gas supplied from the fuel gas supply device 42 in the fuel gas flow path 41, where it is supplied to the fuel cell 20 and reused.

An exhaust flow path 61 is provided as a branch on the circulation flow path 51, that discharges fuel offgas discharged from the fuel gas circulation system to outside the vehicle via a dilutor 62 (for example, a device that reduces the hydrogen concentration). The exhaust flow path 61 includes an exhaust gas valve (discharge means) 63 that controls the discharge of fuel offgas. By opening or closing the exhaust gas valve 63, fuel offgas in which the concentration of impurities has increased as a result of repeated circulation within the fuel cell is discharged to the outside, and new fuel gas is introduced, thereby preventing the reduction of cell voltage.

Also, by pulsing the internal pressure within the circulation flow path 51 moisture that has accumulated in the gas flow path can be removed.

On the other hand, the oxidizing gas supply system of the fuel cell system 10 is provided with an oxidizing gas flow path 71 that supplies oxidizing gas to the cathode gas channel 26, and a cathode offgas flow path 72 that discharges cathode offgas discharged from the cathode gas channel 26. The oxidizing gas flow path 71 is provided with an oxidizing gas supply device 73 which is constituted by an air filter 74 that removes dust and dirt included in the air taken in from the atmosphere, and an air compressor 75 driven by a motor, and which supplies compressed air as the oxidizing gas to the oxidizing gas flow path 71. Also, in a humidifier 76 provided downstream of the oxidizing gas supply device 73, exchange of moisture occurs between cathode offgas in a high humidity condition due to the water generated in the cell reaction of the fuel cell 20 and the oxidizing gas in a low humidity condition which is taken in from the atmosphere.

The back pressure of the cathode gas channel 26 is adjusted to be virtually constant by a pressure adjustment valve 77 in the cathode gas flow path 72. The cathode offgas flowing in the cathode gas flow path 72 is discharged outside the vehicle via a gas-liquid separator, a muffler or the like, depending upon the design, and a part thereof flows into the dilutor 62 and mixes with and dilutes fuel offgas retained in the dilutor 62 and is discharged from the vehicle.

The control unit 80 includes a control computer system not shown in the drawings, and controls the operation of each part of the fuel cell system in accordance with a control program not shown in the drawings. The control computer system may be constituted by a commonly known and available system.

For example, the control unit 80 receives signals from temperature sensors T and pressure sensors P installed on each flow path, drives each motor to adjust the rate of revolution of the circulation pump 55 and the air compressor 74, and controls the opening and closing and degree of opening of each valve, in accordance with the cell operating state (for example, the electrical power load).

For example, when the power from the electricity storage device 81 is sufficient for operating the electric vehicle, the control unit 80 controls the electrical power to be supplied from the electricity storage device 81 alone, and when the power is insufficient the control unit 80 controls the electrical power to be supplied from both the electricity storage device 81 and the fuel cell system 10. In other words, the control unit 80 controls the fuel cell system 10 to operate intermittently by switching between the generation state and the generation stop state in accordance with the power required by the electric automobile, the charging state of the electricity storage device 81, the water temperature of the fuel cell 20, or the like.

The operation of the control unit 80 during intermittent operation is basically the same as operation during intermittent operation of a conventional fuel cell electric automobile. For example, under low load conditions when the generation efficiency (fuel consumption) of the fuel cell 20 is lower, such as when the vehicle is stopped, the fuel cell 20 is stopped and power is supplied from the electricity storage device 81. On the other hand, when the amount of power stored in the electricity storage device 81 is reduced or the load is increased, the fuel cell 20 is made to generate power to supply power to the load and charge the electricity storage device 81.

However, in the present embodiment, the operation of the control unit 80 differs from that of a conventional system in that during intermittent operation when changing from the generation state to the generation stop state, whether to stop the generation operation is determined based at least upon the temperature of specific components within the fuel cell system 10 in which there is moisture, and generation is stopped only when it is permissible to stop.

The following is an explanation of an example of the operation of a control unit 80 in determining whether to stop the generation operation during intermittent operation, with reference to FIGS. 3 and 4.

(First Embodiment: FIG. 3)

When generating power during intermittent operation, the control unit 80 determines whether the conventional conditions for stopping generation (for example, conditions such as the load is low, charging is insufficient, water temperature is high), in other words, the stopping conditions (first stopping conditions) based on the power required by the electric vehicle (load on the motors or the like), the charging state of the electricity storage device 81, the water temperature of the fuel cell 20 or the like, are fulfilled or not (S100), and if they are not fulfilled the stopping determination process terminates.

On the other hand, if the first stopping conditions are fulfilled, the control unit 80 determines that a request to stop the generation is issued to the fuel cell 20, and directly measures the temperature of specific components that contain moisture from among the components within the fuel cell system 10, using temperature sensors provided corresponding to the specific components (S101).

Here at least one of the valves, passages, humidifier or the like, provided on the flow paths of the fuel gas or oxidizing gas, can be selected as the specific components in which moisture is present. For example, each passage, the shutoff valve 43, the regulator 45, the shutoff valve 46 or the like of the fuel gas flow path 41, each passage, the shutoff valve 52, the discharge water valve 54, the back flow prevention valve 56 or the like of the circulation flow path 5, each passage, the exhaust gas valve 63 or the like on the exhaust flow path 61, each passage, the humidifier 76, the shutoff valve that opens and closes the oxidizing gas supply port to the fuel cell (inlet) or the like on the oxidizing gas flow path 71, each passage, the pressure adjustment valve 77 or the like of the cathode offgas flow path 72. Of these components, those that are arranged in a position near to the external surface (for example, the lower surface of the vehicle, or the like) are cooled by the external air and the moisture can easily freeze, so it is particularly desirable that these components are selected as the specific components. In other words, the above specific components may be described as components external to the fuel cell (stack) 20 in the fuel cell system. Alternatively, they may be described as components exposed to the external air, or components in contact with the external air that are easily affected by heat transfer to the external air. Note that in FIG. 1 only some of the temperature sensors are shown.

Next, the control unit 80 determines whether the temperature measured for each specific component exceeds the specific threshold value m or not (second stopping conditions) (S102).

If the measured temperatures all exceed the threshold temperature m it is determined that the generation operation can be stopped, and the process of changing to the generation stop state is executed (for example, stopping the fuel gas supply device 42, the oxidizing gas supply device 73 or the like, starting the PCU 82 and supplying power from the electricity storage device 81 to the motor 83 or the like) (S103).

When in the generation stop state during intermittent operation, the control unit 80 determines whether the conditions for transferring to the generation state are fulfilled in the same way as in a conventional fuel cell system, based on the power required by the electric automobile, the charging state of the electricity storage device 81, the temperature of the water in the fuel cell 20, or the like, and if the conditions are fulfilled the process for transferring to the generation state is executed.

On the other hand, if any of the temperatures measured directly by the temperature sensors are equal to or less than the threshold value m, the control unit 80 determines that it is not possible to stop generation operation since the risk of freezing of the specific component whose temperature is equal to or less than the threshold value m is high, so continues generation state regardless of the fulfillment of the first stopping conditions (S104), and terminates the stopping determination process without performing process of transferring to the generation stop state.

At this time the control means 80 controls the generation state of the fuel cell 20 (for example increases the output) so that the temperature of each of the specific components are controlled to exceed the threshold temperature by the heat generated (exhaust heat), so that the generation operation of the fuel cell can be stopped based on the first stopping conditions as in a conventional system (in other words, so that intermittent operation is not restricted by the second stopping conditions).

According to the configuration of the first embodiment, the temperatures of specific components that contain moisture from among the components within the fuel cell system 10 are measured, and it is determined whether to stop the generation operation based on at least these measured temperatures, so if the temperature of the specific components is low and the risk of moisture freezing is high, the generation operation is not stopped even during intermittent operation, so it is possible to reliably avoid freezing of the moisture.

(Second Embodiment: FIG. 4)

When generating power during intermittent operation, the control unit 80 determines whether the conventional conditions for stopping generation are fulfilled or not, in other words the first stopping conditions based on the power required by the electric automobile, the charging state of the electricity storage device 81, the water temperature of the fuel cell 20, or the like. (S200) are fulfilled or not.

Next, if the first stopping conditions are fulfilled, the control unit 80 determines that a request to stop the generation is issued to the fuel cell 20, and measures the temperature T of the specific components that contain moisture from among the components within the fuel cell system 10 (S201).

Here, in the second embodiment, it is assumed that the specific components in which moisture is present are the same components as for the first embodiment, but instead of directly measuring the temperature of these specific components using temperature sensors, a process is carried out to indirectly measure the temperature of the specific components from the external air temperature, the vehicle speed, the operating state of the fuel cell system, or the like. The operating state of the fuel cell system can be for example the generation output, the amount of reaction gas, the gas temperature, the temperature of the fuel cell stack, or the like.

An indirect method of measurement of the temperature could be for example using the following Formula (4) with the three parameters TOUT: the external air temperature output from an external air temperature sensor provided on the electric automobile (or the fuel cell system 10), V: the vehicle velocity output by a vehicle velocity sensor provided on the electric automobile, and P: the generation output (electrical power) of the fuel cell 20.

$$\text{Component temperature } T = \text{external air temperature } TOUT - a \times \text{vehicle velocity } V - b \times \text{output } P \quad (4)$$

In the above formula a, b are coefficients determined based on the characteristics of the electric automobile and the fuel cell system 10 (vehicle specific coefficients).

Next, the control unit 80 determines whether the component temperatures T measured indirectly based on the above Formula (4) exceed the threshold value m or not (second stopping conditions) (S202).

If the component temperatures T exceed the threshold value m, it is determined that the generation operation can be stopped, and the process of changing to the generation stop state is executed in the same way as in a conventional system (S203).

On the other hand, if the component temperatures T measured in S202 are equal to or less than the threshold value m, the control unit 80 determines that it is not possible to stop generation since the risk of freezing of the components is high, and continues generation state regardless of the fulfillment of the first stopping conditions (S204), and terminates the stopping determination without performing process of transferring to the generation stop state.

At this time the control means 80 controls the operating state of the fuel cell 20 (for example increases the output) so that the component temperature T of the specific components are controlled to exceed the threshold temperature m by the heat generated (exhaust heat), so that the generation operation can be stopped based on the first stopping conditions as in a conventional system (in other words, so that intermittent operation is not restricted by the second stopping conditions). In this case the output P of the fuel cell 20 can be controlled so that for example the following Formula (5) is satisfied.

$$\text{Output } P > (\text{component temperature } T - \text{external air temperature } TOUT + a \times \text{vehicle speed } V)/b \quad (5)$$

According to the configuration of the second embodiment, the same as in the first embodiment the temperatures of components that contain moisture from among the components within the fuel cell system 10 are measured, and it is determined whether to stop the generation operation based on these measured temperatures at least, so if the temperature of the specific components is low and the risk of moisture freezing is high the generation operation is not stopped even during intermittent operation, so it is possible to reliably avoid freezing of the moisture. Also, compared with the first embodiment it is not necessary to provide temperature sensors for each specific component.

(Examples of Variations)

The present invention is not limited to the above examples of embodiments, for example it is possible to combine the configurations of the first and second embodiments, or to apply many types of variations.

Also for example, in the above examples of embodiments, when the second stopping conditions are not fulfilled (component temperatures are equal to or less than the threshold temperature m), generation operation during intermittent operation cannot be stopped, but for example, a control process (operation of the control unit 80) may be configured in such a manner that the risk of freezing of the specific components is determined to be high and intermittent operation itself is forbidden when the second stopping conditions are not fulfilled. Forbidding intermittent operation means forbidding the change to the generation stop state during intermittent operation.

Also for example, the above examples of embodiments are configured so that the first stopping conditions are checked first, and then the second stopping conditions are checked, but the present invention is not necessarily limited to this kind of configuration. For example, a configuration in which first the second stopping conditions are checked, and if the second stopping conditions are fulfilled the first stopping conditions are checked may be adopted.

Also for example, in the second embodiment, one type of conditions based on the component temperature T was explained as the second stopping conditions, but for example the second stopping conditions may include a plurality of types of conditions, and these plurality of types of conditions may be checked sequentially. For example, if the first stopping conditions are fulfilled, whether the external air temperature TOUT exceeds a predetermined threshold (for example 5° C.) is determined as the first of the second stopping conditions, and if the predetermined threshold is exceeded it is determined that the generation operation can be stopped. On the other hand, if TOUT is equal to or less than the predetermined threshold value, the component temperature T is obtained based on Formula (4), and S102 (and subsequent processes) is executed as the second of the second stopping conditions.

Furthermore, by combining these forms, it is possible to consider the process flow of a freeze prevention process as shown in FIG. 5. First the external air temperature TOUT is measured (S300). Next, it is determined whether the external air temperature TOUT exceeds a predetermined threshold value (for example 5° C.) or not (S301), and if the predetermined temperature is exceeded normal intermittent operation mode (the mode in which it is determined whether the generation operation can be stopped or not based on the first stopping conditions) is set (S302). On the other hand, if the external air temperature TOUT is equal to or less than the predetermined threshold value, the component temperatures of the specific components are obtained either directly or indirectly (S303), and it is determined whether the component temperatures exceed the predetermined threshold value m or not (S304). Then if the component temperatures exceed the threshold temperature m, normal intermittent operation mode is set (S302), and if they are equal to or less than the threshold value m it is determined that the risk of freezing of the specific components is high, and intermittent operation forbidden mode (the mode in which the generation operation cannot be stopped) is set (S305). By executing the series of these processes repeatedly at a predetermined timing, an effect the same as the above embodiments is obtained.

We claim:

1. A control device that controls a fuel cell system to operate intermittently by switching between a power generation state and a power generation stop state of a fuel cell, wherein
the control device is programmed to, during the power generation state:
perform a first determination as to whether to stop a power generation operation during intermittent operation based on a temperature of the fuel cell,
perform a second determination as to whether to stop the power generation operation during the intermittent operation based on at least a temperature of a specific component that is external to the fuel cell and that contains moisture, and
continue the power generation operation when it is determined not to stop the power generation operation in the second determination, although it is determined to stop the power generation operation in the first determination, and
the temperature of the specific component is measured while the operation of the fuel cell system is being carried out.

2. The control device according to claim 1, wherein the specific component is at least one of a valve, a passage, and a humidifier arranged on a flow path for a fuel gas or an oxidizing gas.

3. The control device according to claim 1, wherein the temperature of the specific component is measured directly by a temperature sensor provided corresponding to the specific component.

4. The control device according to claim 1, wherein the temperature of the specific component is measured indirectly based on at least one of either an operating state of the fuel cell system or an external air temperature.

5. A fuel cell system comprising,
an electricity storage device that stores electrical power generated by a fuel cell, the electrical storage device serving as a first electrical power supply source to a consumption device which consumes electrical power, the fuel cell serving as a second electrical power supply source to the consumption device which consumes electrical power; and
the control device according to claim 1,
wherein the fuel cell system operates intermittently by switching between the power generation state and the power generation stop state of the fuel cell.

6. A fuel cell hybrid vehicle comprising the fuel cell system according to claim 5.

7. The control device according to claim 1, wherein the control device determines not to stop the power generation operation, if the temperature of the specific component is equal to or less than a predetermined threshold value.

8. The control device according to claim 7, wherein in determining whether to stop or not, when it is determined to not stop, the control device is further programmed to control the power generation state of the fuel cell system so that the measured temperature exceeds a threshold value.

* * * * *